(12) United States Patent
Kwon et al.

(10) Patent No.: US 11,013,034 B2
(45) Date of Patent: May 18, 2021

(54) SYSTEM AND METHOD FOR RANDOM ACCESS COMMUNICATIONS

(71) Applicant: Futurewei Technologies, Inc., Plano, TX (US)

(72) Inventors: Young Hoon Kwon, Laguna Niguel, CA (US); Pengfei Xia, San Diego, CA (US); Bin Liu, San Diego, CA (US)

(73) Assignee: Futurewei Technologies, Inc., Plano, TX (US)

(*) Notice: Subject to any disclaimer, the term of this patent is extended or adjusted under 35 U.S.C. 154(b) by 0 days.

(21) Appl. No.: 15/990,203

(22) Filed: May 25, 2018

(65) Prior Publication Data

US 2019/0075600 A1    Mar. 7, 2019

Related U.S. Application Data

(60) Provisional application No. 62/571,054, filed on Oct. 11, 2017, provisional application No. 62/567,860, (Continued)

(51) Int. Cl.
  *H04B 7/06*    (2006.01)
  *H04W 72/04*   (2009.01)
  *H04W 74/08*   (2009.01)

(52) U.S. Cl.
  CPC ...... *H04W 74/0833* (2013.01); *H04B 7/0695* (2013.01); *H04W 72/046* (2013.01)

(58) Field of Classification Search
  CPC .. H04B 7/0617; H04B 7/0626; H04B 7/0695; H04W 16/28; H04W 24/08; H04W 24/10;
  (Continued)

(56) References Cited

U.S. PATENT DOCUMENTS 9,603,165 B2 * 3/2017 Furuskog .......... H04W 72/1294
9,954,590 B2 * 4/2018 Yu ....................... H04W 16/28
(Continued)

FOREIGN PATENT DOCUMENTS

CN    101801096 A    8/2010
CN    104956606 A    9/2015
(Continued)

OTHER PUBLICATIONS

MCC Support, "Draft Report of 3GPP TSG RAN WG1 #89 v0.2.0," 3GPP TSG RAN WG1 Meeting #90, Hangzhou, China, May 15-19, 2017, 166 pages.
(Continued)

*Primary Examiner* — Alpus Hsu
(74) *Attorney, Agent, or Firm* — Slater Matsil, LLP

(57) ABSTRACT

A method for operating an access node includes receiving a first random access preamble in a first random access resource, wherein the first random access preamble and the first random access resource at least partially identifies a first beam selected by a user equipment (UE), and wherein the first random access resource is one of a plurality of random access resources assigned to the UE, and determining that first additional information associated with the first beam is needed, and based thereon, sending a first message responsive to the first random access preamble, the first message including a first information set to request the additional information associated with the first beam, and receiving a second message including the first additional information associated with the first beam.

21 Claims, 8 Drawing Sheets

Related U.S. Application Data filed on Oct. 4, 2017, provisional application No. 62/555,375, filed on Sep. 7, 2017.

(58) Field of Classification Search
CPC ......... H04W 72/0406; H04W 72/0446; H04W 72/046; H04W 74/0833
See application file for complete search history.

(56) References Cited

U.S. PATENT DOCUMENTS

| | | | |
|---|---|---|---|
| 10,159,003 B2* | 12/2018 | Ho | H04W 16/28 |
| 10,299,275 B2* | 5/2019 | Hou | H04B 7/0695 |
| 2014/0177607 A1* | 6/2014 | Li | H04B 7/0617 |
| | | | 370/336 |
| 2015/0305066 A1* | 10/2015 | Jeong | H04W 74/0833 |
| | | | 370/225 |
| 2015/0382205 A1* | 12/2015 | Lee | H04B 7/0417 |
| | | | 370/329 |
| 2016/0029358 A1 | 1/2016 | Hou et al. | |
| 2016/0192401 A1 | 6/2016 | Park et al. | |
| 2017/0195033 A1* | 7/2017 | Zhang | H04W 72/046 |
| 2017/0207843 A1* | 7/2017 | Jung | H04B 7/0695 |
| 2017/0231011 A1* | 8/2017 | Park | H04W 16/14 |
| 2017/0302414 A1* | 10/2017 | Islam | H04L 5/0048 |
| 2017/0325057 A1* | 11/2017 | Zhang | H04W 4/02 |
| 2018/0027594 A1* | 1/2018 | Nagaraja | H04B 7/0695 |
| | | | 370/329 |
| 2018/0070380 A1* | 3/2018 | Nagaraja | H04B 7/0695 |
| 2018/0219604 A1* | 8/2018 | Lu | H04B 7/0695 |
| 2018/0343043 A1* | 11/2018 | Hakola | H04B 7/0417 |
| 2018/0368126 A1* | 12/2018 | Islam | H04L 1/00 |
| 2019/0053313 A1* | 2/2019 | Zhou | H04W 52/146 |
| 2019/0053314 A1* | 2/2019 | Zhou | H04B 7/0695 |
| 2019/0104549 A1* | 4/2019 | Deng | H04B 7/0617 |
| 2019/0215874 A1* | 7/2019 | Chen | H04W 72/046 |

FOREIGN PATENT DOCUMENTS

| | | |
|---|---|---|
| CN | 105379357 A | 3/2016 |
| CN | 106793148 A | 5/2017 |
| WO | 2014139174 A1 | 9/2014 |
| WO | 2017088898 A1 | 6/2017 |

OTHER PUBLICATIONS

MICC Support, "Final Report of 3GPP TSG RAN WG1 #90 v1.0.0," 3GPP TSG RAN WG1 Meeting #90bis, R1-1716941, Prague, Czech, Oct. 9-13, 2017, 172 pages.

Huawei, "Procedure Details for Beam Failure Recovery", 3GPP TSG RAN WG1 Meeting #90, R1-171224, Aug. 21-25, 2017, 12 pages, Prague, Czech Republic.

* cited by examiner

SYSTEM AND METHOD FOR RANDOM ACCESS COMMUNICATIONS

This application claims the benefit of U.S. Provisional Application No. 62/555,375, filed on Sep. 7, 2017, entitled "System and Method for Random Access Communications", U.S. Provisional Application No. 62/567,860, filed on Oct. 4, 2017, entitled "System and Method for Random Access Communications", and U.S. Provisional Application No. 62/571,054, filed on Oct. 11, 2017, entitled "System and Method for Random Access Communications", which applications are hereby incorporated by reference in their entireties.

TECHNICAL FIELD

The present disclosure relates generally to a system and method for digital communications, and, in particular embodiments, to a system and method for random access communications.

BACKGROUND

Preamble sequences are transmitted in contention-free or contention-based random access resources to initiate requests. However, due to propagation delay and multipath delay spread, a cyclic prefix that is greater than a combination of the propagation delay and the multipath delay spread is applied to the preamble sequences to preserve orthogonality of the preamble sequences. The cyclic prefix may be very large when compared to the length of the preamble sequences, resulting in significant communications overhead. Therefore, there is a need for systems and methods for performing random access communications with reduced communications overhead to improve overall efficiency.

SUMMARY

Example embodiments provide a system and method for random access communications.

In accordance with an example embodiment, a computer implemented method for operating an access node is provided. The method includes receiving, by the access node from a user equipment (UE), a first random access preamble in a first random access resource, wherein the first random access preamble and the first random access resource at least partially identifies a first beam selected by the UE, and wherein the first random access resource is one of a plurality of random access resources assigned to the UE, and determining, by the access node, that first additional information associated with the first beam is needed, and based thereon, sending, by the access node to the UE, a first message responsive to the first random access preamble, the first message including a first information set to request the additional information associated with the first beam, and receiving, by the access node from the UE, a second message including the first additional information associated with the first beam.

Optionally, in any of the preceding embodiments, wherein the first random access preamble and a position of the first random access resource in the plurality of random access resources identifies the first beam selected by the UE.

Optionally, in any of the preceding embodiments, further includes receiving, by the access node from the UE, a second random access preamble in a second random access resource, wherein the second random access preamble and the second random access resource at least partially identifies a second beam selected by the UE, wherein the second random access resource is one of the plurality of random access resources assigned to the UE, and determining, by the access node, that second additional information associated with the second beam is not needed, and based thereon, sending, by the access node to the UE, a third message responsive to the second random access preamble, the third message including a second information set to not request the second additional information associated with the second beam.

Optionally, in any of the preceding embodiments, wherein the first information is set to a first value to request the first additional information associated with the first beam, and wherein the second information is set to a second value to not request the second additional information associated with the second beam.

Optionally, in any of the preceding embodiments, wherein the second value is a zero value.

Optionally, in any of the preceding embodiments, wherein the first additional information associated the first beam comprises at least one of channel quality information of the first beam, a beam index of the first beam within the random access resource, a beam index of the first beam within a reference signal beam, or a channel state information reference signal (CSI-RS) resource index (CRI) of the first beam.

Optionally, in any of the preceding embodiments, wherein the channel quality information of the first beam comprises at least one of a reference signal received power (RSRP) of the first beam, a reference signal received quality (RSRQ) of the first beam, a signal plus interference to noise ratio (SINR) of the first beam, or a signal to noise ratio (SNR) of the first beam.

Optionally, in any of the preceding embodiments, wherein the first random access preamble is one of a plurality of random access preambles assigned to the UE.

Optionally, in any of the preceding embodiments, wherein the first random access preamble comprises a beam failure recovery preamble, and wherein the first random access resource comprises a beam failure recovery resource.

In accordance with an example embodiment, a computer implemented method for operating a UE is provided. The method includes selecting, by the UE, a first beam, selecting, by the UE, a random access resource from a plurality of random access resources assigned to the UE, wherein a random access preamble and the selected random access resource at least partially identifies the first beam, sending, by the UE to an access node, the random access preamble in the selected random access resource, receiving, by the UE from the access node, a first message responsive to the random access preamble, and determining, by the UE, that the first message includes a first information set to request first additional information associated with the first beam, and based thereon, sending, by the UE to the access node, a second message including the first additional information associated with the first beam.

Optionally, in any of the preceding embodiments, wherein the first additional information associated with the first beam comprises at least one of channel quality information of the first beam, a beam index of the first beam within the random access resource, a beam index of the first beam within a reference signal beam, or a CRI of the first beam.

Optionally, in any of the preceding embodiments, wherein the channel quality information of the first beam comprises at least one of a RSRP of the first beam, a RSRQ of the first beam, a SINR of the first beam, or a SNR of the first beam.

Optionally, in any of the preceding embodiments, wherein the first information is set to a first value to request the first additional information associated with the first beam, and wherein a second information is set to a second value to not request second additional information associated with a second beam.

Optionally, in any of the preceding embodiments, wherein the second value is a zero value.

Optionally, in any of the preceding embodiments, wherein the random access preamble is one of a plurality of random access preambles assigned to the UE.

Optionally, in any of the preceding embodiments, wherein the random access preamble comprises a beam failure recovery preamble, and wherein the random access resource comprises a beam failure recovery resource.

In accordance with an example embodiment, an access node is provided. The access node includes a memory storage comprising instructions, and one or more processors in communication with the memory storage. The one or more processors execute the instructions to receive, from a UE, a first random access preamble in a first random access resource, wherein the first random access preamble and the first random access resource at least partially identifies a first beam selected by the UE, and wherein the first random access resource is one of a plurality of random access resources assigned to the UE, and determine that first additional information associated with the first beam is needed, and based thereon, send, to the UE, a first message responsive to the first random access preamble, the first message including a first information set to request the additional information associated with the first beam, and receive, from the UE, a second message including the first additional information associated with the first beam.

Optionally, in any of the preceding embodiments, wherein the one or more processors further execute the instructions to receive, from the UE, a second random access preamble in a second random access resource, wherein the second random access preamble and the second random access resource at least partially identifies a second beam selected by the UE, wherein the second random access resource is one of the plurality of random access resources assigned to the UE, and determine that second additional information associated with the second beam is not needed, and based thereon, send, to the UE, a third message responsive to the second random access preamble, the third message including a second information set to not request the second additional information associated with the second beam.

Optionally, in any of the preceding embodiments, wherein the first information is set to a first value to request the first additional information associated with the first beam, and wherein the second information is set to a second value to not request the second additional information associated with the second beam.

In accordance with an example embodiment, a UE is provided. The UE includes a memory storage comprising instructions, and one or more processors in communication with the memory storage. The one or more processors execute the instructions to select a first beam, select a random access resource from a plurality of random access resources assigned to the UE, wherein a random access preamble and the selected random access resource at least partially identifies the first beam, send, to an access node, the random access preamble in the selected random access resource, receive, from the access node, a first message responsive to the random access preamble, and determine that the first message includes a first information set to request first additional information associated with the first beam, and based thereon, send, to the access node, a second message including the first additional information associated with the first beam.

Optionally, in any of the preceding embodiments, wherein the first additional information associated with the first beam comprises at least one of channel quality information of the first beam, a beam index of the first beam within the random access resource, a beam index of the first beam within a reference signal beam, or a CRI of the first beam.

Optionally, in any of the preceding embodiments, wherein the channel quality information of the first beam comprises at least one of a RSRP of the first beam, a RSRQ of the first beam, a SINR of the first beam, or a SNR of the first beam.

Practice of the foregoing embodiments enables improved efficiency in transmitting a preamble for random access when the device has knowledge of the propagation delay. Knowledge of the propagation delay allows the device to compensate for the propagation delay and not have to rely on extended cyclic prefix values, which degrade the overall communications efficiency.

Practice of the foregoing embodiments also enables a first device to obtain additional detailed information regarding a candidate beam from a second device in a situation where there are fewer reference signal blocks than beam failure reference signal resources because information derivable from preamble assignment and beam failure recovery resource index is insufficient to identify the candidate beam of the second device. The ability to obtain the additional detailed information as needed results in improved efficiency when compared to a deployment when the additional detailed information is always sent.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION OF ILLUSTRATIVE EMBODIMENTS

The making and using of the disclosed embodiments are discussed in detail below. It should be appreciated, however, that the present disclosure provides many applicable inventive concepts that can be embodied in a wide variety of specific contexts. The specific embodiments discussed are merely illustrative of specific ways to make and use the embodiments, and do not limit the scope of the disclosure.

Figure 1:
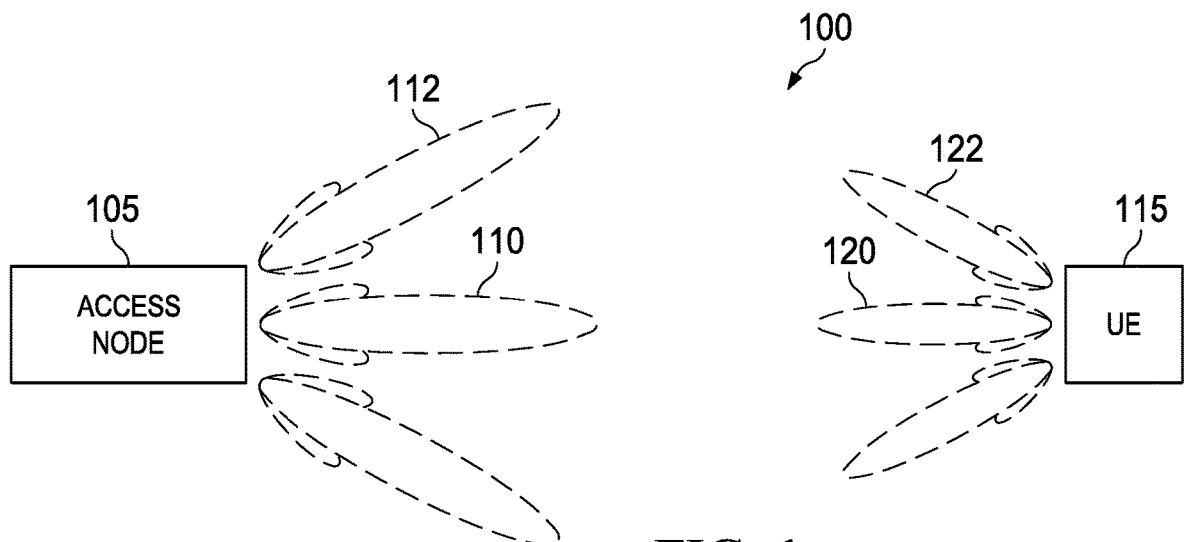
FIG. 1 illustrates an example wireless communications system according to example embodiments described herein.

FIG. 1 illustrates an example wireless communications system 100. Communications system 100 includes an access node 105 serving a user equipment (UE) 115. In a first operating mode, communications to and from UE 115 pass through access node 105. In a second operating mode, communications to and from UE 115 do not pass through access node 105, however, access node 105 typically allocates resources used by UE 115 to communicate. Access nodes may also be commonly referred to as evolved NodeBs (eNBs), base stations, NodeBs, master eNBs (MeNBs), secondary eNBs (SeNBs), next generation (NG) NodeBs (gNBs), master gNBs (MgNBs), secondary gNBs (SgNBs), remote radio heads, access points, and the like, while UEs may also be commonly referred to as mobiles, mobile stations, terminals, subscribers, users, stations, and the like.

While it is understood that communications systems may employ multiple access nodes capable of communicating with a number of UEs, only one access node and one UE are illustrated for simplicity.

Path loss is high in communications systems operating at high frequency (HF) (6 gigahertz (GHz) and above, such as millimeter wavelength (mmWave)) operating frequencies, and beamforming may be used to overcome the high path loss. As shown in FIG. 1, both access node 105 and UE 115 communicate using beamformed transmissions and receptions. As an example access node 105 communicates using a plurality of communications beams, including beams 110 and 112, while UE 115 communicates using a plurality of communications beams, including beams 120 and 122.

A beam may be a pre-defined set of beamforming weights in the context of codebook-based precoding or a dynamically defined set of beamforming weights in the context of non-codebook based precoding (e.g., Eigen-based beamforming (EBB)). A beam may also be a pre-defined set of phase shift preprocessors combining signals from the antenna array in the radio frequency (RF) domain. It should be appreciated that a UE may rely on codebook-based precoding to transmit uplink signals and receive downlink signals, while a transmission reception point (TRP) may rely on non-codebook based precoding to form certain radiation patterns to transmit downlink signals or receive uplink signals.

The beams of HF communications systems are fragile due to the high path loss present at HF. The beams are easily blocked by objects or entities located in or near the path between source and destination. The signal quality of beams that are experiencing blockage is typically significantly lower when compared to the signal quality prior to the occurrence of the blockage (or even beams that are not blocked). When the signal quality drops below a specified threshold, the associated beam(s) may be deemed as having failed. In other words, a beam is deemed as a failed beam when the signal quality associated with the beam drops below the specified threshold. Alternatively, a beam may be deemed as having failed if the decoding of received packets of a particular channel fails for a specified number of packets or for a specified amount of time.

When a beam failure between an access node and a UE is detected, the UE may select one or more replacement beams from a set of candidate beams of the access node detectable by the UE to replace the failed beam. The replacement of the failed beam with the one or more replacement beam occurs during a beam failure recovery procedure performed by the UE and the access node. The beam failure recovery procedure may be initiated by the UE, or alternatively, the access node may initiate the beam failure recovery procedure. A detailed discussion of an example UE initiated beam failure recovery procedure is as follows:

The UE detects a beam failure with all or parts of a channel (such as a physical downlink control channel (PDCCH) or some other control channel) fails, where the channel fails when a quality value or indicator (such as signal quality (e.g., signal plus interference to noise ratio (SINR), signal to noise ratio (SNR), reference signal received power (RSRP), reference signal received quality (RSRQ), and so on) does not meet a specified threshold, a performance metric (e.g., specified number of successive failed packet decode attempts, count of failed packet decode attempts within time interval exceeds a specified threshold, and so forth), etc.);

The UE detects (or selects) one or more candidate beams and determines its identity, New Identified Beam (NIB). The one or more candidate beams may be detected in accordance with measurements of reference signals, such as beam failure reference signals (BFRS), transmitted by the access node on different beams of the access node. It is noted that the BFRS may include channel state information reference signals (CSI-RS), synchronization signals (SS), a reference signal specifically designed for beam failure recovery, or a combination thereof. The NIB may be a beam index of the BFRS, such as a CSI-RS index (CRI), an SS index (SSI), and so on;

The UE sends a beam failure recovery request (BFRQ) to the access node. The BFRQ may include at least a preamble. The preamble may be UE-specific so that the access node is able to identify the UE in accordance with the received preamble. The preamble may be pre-assigned to the UE by the access node, such as by a radio resource control (RRC) message. The preamble is hereby referred to herein as a beam recovery random access channel (BRACH) preamble; and The access node analyzes the received preamble to identify the UE, i.e., determine a UE ID. Identifying the UE allows the access node to act accordingly, e.g., send a response to the BFRQ (a beam failure recovery response (BFRP)) to the UE that sent the BFRQ.

Figure 2:
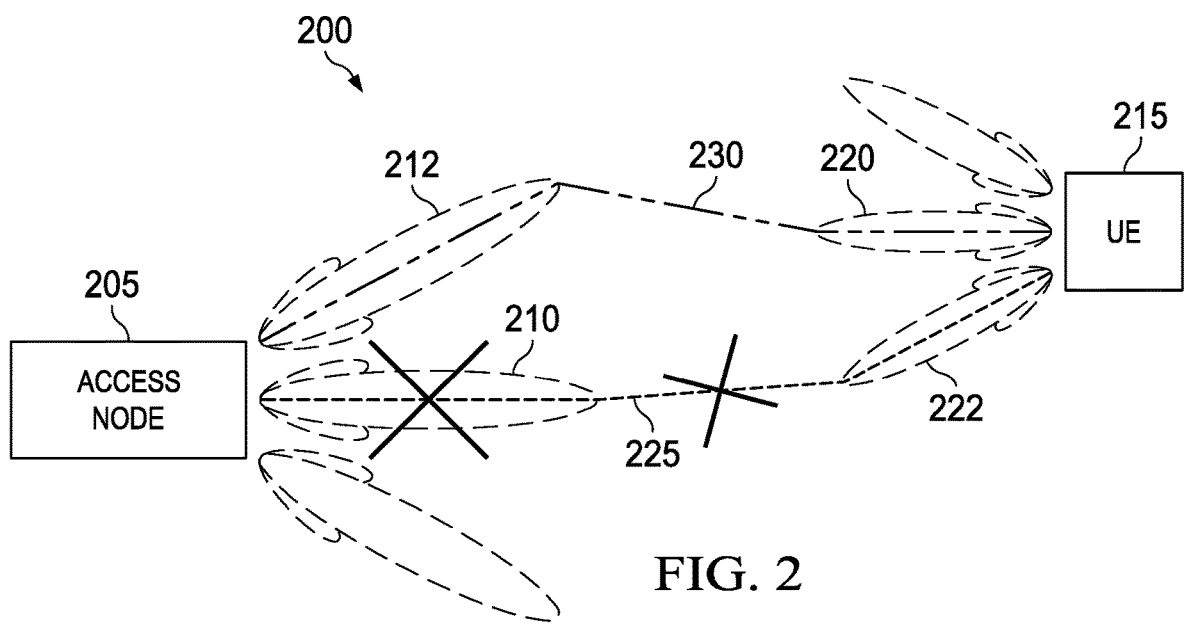
FIG. 2 illustrates a wireless communications system highlighting beam failure and beam failure recovery according to example embodiments described herein.

FIG. 2 illustrates a wireless communications system 200 highlighting beam failure and beam failure recovery. Communications system 200 includes an access node 205 serving a UE 215. As shown in FIG. 2, both access node 205 and UE 215 communicate using beamformed transmissions and receptions. As an example access node 205 communicates using a plurality of communications beams, including beams 210 and 212, while UE 215 communicates using a plurality of communications beams, including beams 220 and 222.

Initially, access node 205 and UE 215 are communicating through beam-pair-link (BPL) 225, which comprises beams 210 and 222. However, due to blockage or UE mobility, BPL 225 fails. UE 215 detects a candidate beam 212 from access node 205 to replace failed beam 210. UE 215 initiates beam failure recovery by sending a BFRQ to access node 205. Upon completion of the beam failure recovery, BPL 230 is established (comprising beams 212 and 220).

In the Third Generation Partnership Project (3GPP) RAN1 #89 meeting, it was agreed that beam failure recovery request transmission is supported on the following channel(s):

Non-contention based channel based upon the physical random access channel (PRACH), which uses a resource orthogonal to resources of other PRACH transmissions, at least for the frequency division multiplexing (FDM) case;
  Other ways of achieving orthogonality, e.g., code division multiplexing (CDM) or time division multiplexing (TDM), with other PRACH resources are for future study;
  Whether or not have different sequence or format than those of PRACH for other purposes are for future study;
  It is noted that this does not prevent PRACH design optimization attempts for beam failure recovery request transmission from other agenda items; and
  The retransmission behavior on this PRACH resource is similar to the regular PRACH procedure and is for future study.
Support using a physical uplink control channel (PUCCH) for beam failure recovery request transmission;
  Whether or not the PUCCH is with beam sweeping is for future study; and
  It is noted that this may or may not PUCCH design.

In the 3GPP RAN1 #90 meeting, the following were considered as working assumptions for beam failure recovery:

For beam failure recovery request transmission on the PRACH, support using the PRACH resource that is CDM with other PRACH resources;
  It is noted that CDM means the same sequence design with PRACH preambles;
  It is also noted that the preambles used with PRACH for beam failure recovery request transmission are chosen from those for contention-free PRACH operation in 3GPP LTE Release-15;
  It is further noted that this feature is not intended to have any impact on design related to other PRACH resources; and
  Whether TDM with other PRACH resources is needed is for future study.

As related to conventional PRACH preamble selection, an access node sends the following information to UEs:

PRACH configuration
  specifies preamble format and system frame or subframe number;
Cyclic shift dimensioning
  specifies cyclic shift increment N_CS or cyclic shift offset so that the Zero Correlation Zone of the sequences guarantees the orthogonality of the PRACH sequences regardless of the delay spread or time uncertainty of each UE;
PRACH frequency offset; and
Root sequence index.

Figure 3:
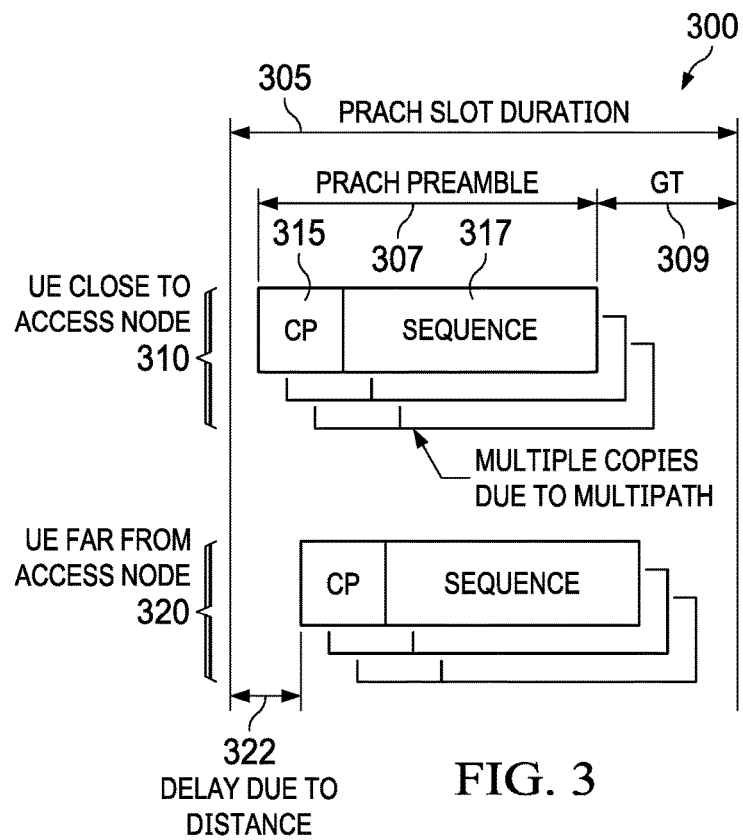
FIG. 3 illustrates a diagram for communicating PRACH preambles.

FIG. 3 illustrates a diagram 300 for communicating PRACH preambles. In the example shown, the PRACH preambles are conventional PRACH preambles. As shown in FIG. 3, a PRACH slot duration 305 includes a duration corresponding to a PRACH preamble 307 and a guard time (GT) 309. A first set of PRACH preambles 310, shown in FIG. 3, represents PRACH preambles received at an access node arising from a PRACH preamble transmitted by a UE that is in close proximity to the access node. A PRACH preamble includes a cyclic prefix (CP) 315 and a sequence 317. Although the UE transmits a single PRACH preamble, the access node may receive multiple copies of the PRACH preamble due to multipath, which leads to multipath propagation and delay spread. A second set of PRACH preambles 320 represents PRACH preambles received at an access node arising from a PRACH preamble transmitted by a UE that is located far from the access node. A delay 322 is due to the distance from the UE to the access node. Delay 322 is commonly referred to as propagation delay. In general, the further the UE is away from the access node, the greater the propagation delay.

As related to the N_CS and the Zero Correlation Zone, different PRACH preambles in the same PRACH slot duration have different cyclic shift delays. It is noted that the PRACH preamble sequence is generated based on a Zadoff-Chu sequence and the Zadoff-Chu sequences have the property that cyclically shifted versions of a Zadoff-Chu sequence are orthogonal to each other, provided that each cyclic shift is greater than a combined propagation delay and multipath delay spread of that signal between a transmitting device and a receiving device. In the 3GPP LTE technical standards, the cyclic shift delay value is defined as an integer multiple of N_CS, which is specified by the access node. Hence, N_CS should be large enough that it is longer than the combined propagation delay and multipath delay spread of the channel (plus any additional time uncertainty) to ensure that the shifted versions of the PRACH preambles are orthogonal to each other.

The design of the PRACH preambles (and associated durations, delays, and so on) is intended for PRACH preambles used for initial access. In random access for initial access, the UEs is without knowledge of the propagation delay to any particular access node. However, random access for beam failure recovery requests has a different user behavior. As an example, in random access for beam failure recovery requests, because the UE is already synchronized to an access node, the UE has knowledge of the propagation delay to the access node (for example, by measuring a downlink signal). Due to the fact that the propagation delay is known to a UE that is sending a PRACH preamble as a beam failure recovery request, the UE can compensate for the propagation delay. Therefore, transmitting the PRACH preamble for a beam failure recovery request using the same design as a PRACH preamble for initial access would lead to degraded performance.

According to an example embodiment, systems and methods for sending PRACH preambles as a beam failure recovery request (i.e., when the UE has knowledge of the propagation delay) with a different design from when PRACH preambles are sent for initial access (i.e., when the UE is without knowledge of the propagation delay), when the PRACH preambles are multiplexed, are provided. As an illustrative example, when a PRACH preamble is sent as a beam failure recovery request, a first N_CS is used, while when a PRACH preamble is sent for initial access, a second N_CS is used. The first N_CS may be smaller than the second N_CS.

According to an example embodiment, PRACH preambles for beam failure recovery request and PRACH preambles for initial access share different regions of cyclic shifts. As an example, a first region for PRACH preambles for initial access uses a first N_CS value, while a second region for PRACH preambles for beam failure recovery request uses a second N_CS value, where the first N_CS is greater than the second N_CS.

Figure 4A:
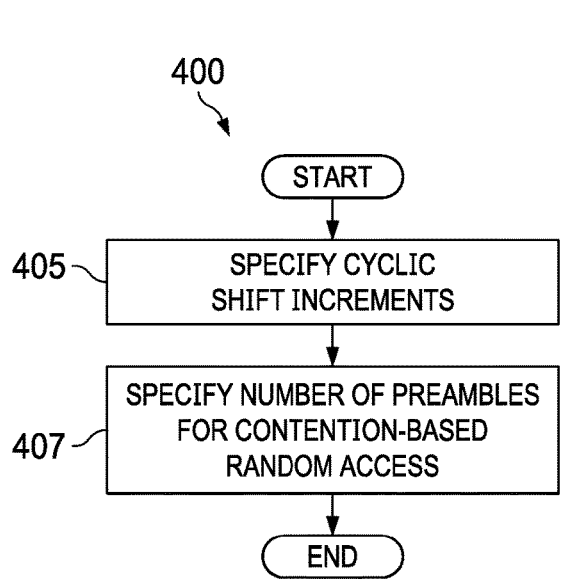
FIG. 4A illustrates a flow diagram of example operations occurring at an access node configuring PRACH operation where PRACH preambles for initial access may be multiplexed with PRACH preambles for beam failure recovery requests according to example embodiments described herein.

FIG. 4A illustrates a flow diagram of example operations 400 occurring at an access node configuring PRACH operation where PRACH preambles for initial access may be multiplexed with PRACH preambles for beam failure recovery requests. Operations 400 may be indicative of operations occurring in an access node as the access node configures PRACH operation where PRACH preambles for initial access may be multiplexed with PRACH preambles for beam failure recovery requests.

Operations 400 begin with the access node specifying cyclic shift increments (block 405). As an example, the access node specifies a first N_CS value N_CSi for PRACH preambles for initial access and a second N_CS value N_CSb for PRACH preambles for beam failure recovery requests. The access node may specify the cyclic shift increments (or any other value, configuration, or information) by sending or signaling the cyclic shift increments (or any other value, configuration, or information) or a representation thereof. In an embodiment, the access node specifies the N_CSi and the N_CSb values by transmitting the N_CSi and the N_CSb values in one or more messages to a UE. In another embodiment, the N_CSi and the N_CSb values are stored in a list or table (available at both the access node and the UE) and the access node specifies the values by transmitting indices corresponding to the values in one or more messages to the UE. In yet another embodiment, the UE has previously received the N_CSi and the N_CSb values, and the access node specifies the values by transmitting a difference between the current values and the previous values in one or more messages to the UE. Therefore, in general, when a first device specifies a value to a second device, the first device may transmit the actual value to the second device, or the first device may transmit a representation of the value to the second device. The access node specifies a number of preambles usable for contention based random access N_CB (block 407).

In an embodiment, the access node specifies N_CSi as an integer multiple of N_CSb. In another embodiment, the access node specifies a specific PRACH preamble used by a UE for beam failure recovery requests as an integer multiple of N_CSb. In another embodiment, the access node specifies a specific PRACH preamble used by a UE for contention-free random access as an integer multiple of N_CSi, where the contention-free random access is not for beam failure recovery requests. In another embodiment, a UE identifies N_CSi from information sent by the access node and the UE uses a predetermined N_CSb.

Figure 4B:
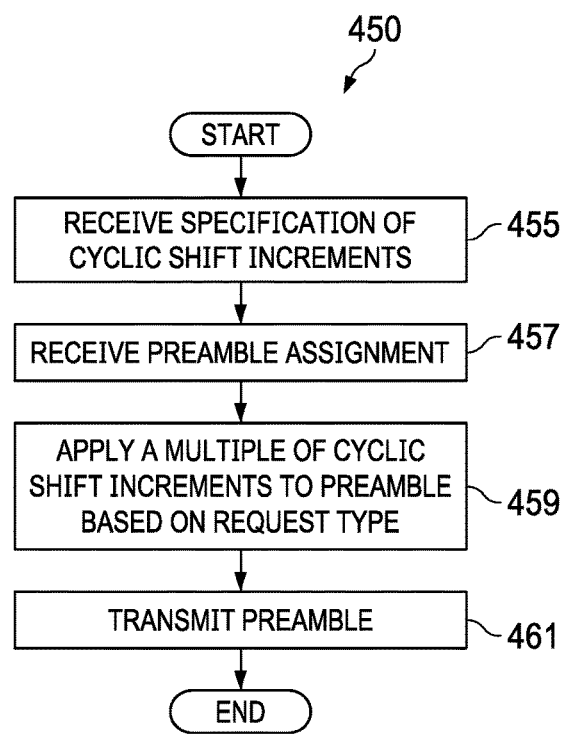
FIG. 4B illustrates a flow diagram of example operations occurring at a UE where the UE is operating with PRACH preambles for initial access multiplexed with PRACH preambles for beam failure recovery requests according to example embodiments described herein.

FIG. 4B illustrates a flow diagram of example operations 450 occurring at a UE where the UE is operating with PRACH preambles for initial access multiplexed with PRACH preambles for beam failure recovery requests. Operations 450 may be indicative of operations occurring in a UE as the UE operates with PRACH preambles for initial access multiplexed with PRACH preambles for beam failure recovery requests.

Operations 450 begin with the UE receiving cyclic shift increments or representations thereof (block 455). The UE may receive N_CSi or N_CSb. The UE receives a preamble assignment of one or more preambles usable for contention based random access (block 457). The UE applies a multiple of a cyclic shift increment selected in accordance with the type of PRACH preamble the UE is to transmit to the preamble (block 459). As an example, if the PRACH preamble is for initial access, the UE applies a multiple of N_CSi to the preamble, while if the PRACH preamble is for beam failure recovery requests, the UE applies a multiple of N_CSb to the preamble. In other words, the cyclic shift increment is selected in accordance with a request type of a request that the UE is intending to send. The UE transmits the preamble (block 461).

According to an example embodiment, PRACH preambles for beam failure recovery request and PRACH preambles for initial access use different root sequences. Using different root sequences allows for a potentially greater number of PRACH preambles to exist in the same PRACH slot with low cross-interference with one another. In an embodiment, PRACH preambles for initial access and PRACH preambles for beam failure recovery requests have different root sequences, but the root sequences are equal length root sequences. In another embodiment, PRACH preambles for initial access and PRACH preambles for beam failure recovery requests have different root sequences of different length, where the cyclic prefix and the guard time for the PRACH preambles for beam failure recovery requests are shorter than the cyclic prefix and the guard time for the PRACH preambles for initial access. In another embodiment, PRACH preambles for initial access and PRACH preambles for beam failure recovery requests share the same root sequence.

As related to BFRQ transmissions, an access node may configure each UE with one or more unique beam failure random access channel (BRACH) preamble within a BRACH region. It is noted that a BRACH is a non-contention based channel based on a PRACH used for beam failure recovery requests. Furthermore, a BRACH preamble is another name for a PRACH preamble for beam failure recovery and is used in the subsequent discussion to avoid confusion. Then, the UE, in case of beam failure recovery, may use a BRACH preamble to send the BFRQ. The access node may send multiple reference signals (such as SSs) in one or more resources with different beamforming of the reference signals on different resources. The access node may configure multiple BRACH regions or resources in the time domain, which may signal (or implicitly defined in technical standards) a fixed relationship between a BRACH resource and a reference signal resource. An example of a fixed relationship is that the transmit beamforming of each different reference signal resource and the receive beamforming of each different BRACH resource having a one-to-one association, e.g., the transmit beam of a first reference signal resource holds a beam correspondence relationship with the receive beam of a first BRACH resource.

Generally, the number of resources for the reference signal blocks may be significantly fewer than the number of resources for candidate beam selection reference signals. As an example, the CSI-RS may be used for candidate beam selection reference signals, while the reference signal blocks (e.g., SS blocks) may be cell-specific with wide beams for robust operation. The CSI-RS resources may be user-specific and narrow beam for higher beamforming gain to improve data transmission rates.

When an access node configures each UE with one or more unique BRACH preambles within a BRACH region, if a UE transmits its assigned BRACH preamble and the access node receives the BRACH preamble correctly in a BRACH resource, an index of the BRACH resource and the BRACH preamble (as identified) may not provide sufficient information regarding a candidate beam of the UE. Therefore, additional information on the UE's candidate beam should be transmitted, resulting in increased communications overhead.

The access node may configure more than one BRACH preamble to a UE within a BRACH region. Each BRACH preamble may represent a CSI-RS beam within the reference signal block that has beam correspondence to the BRACH region. However, in this situation, the number of BRACH preambles needed to support multiple UEs may exceed the number of available BRACH preambles.

A UE detects a beam failure when a signal quality of a channel falls below a specified threshold, for example. As for the signal quality of the channel, several metrics can be used. In the 3GPP RAN1 discussion, two signal quality measures were considered in detecting the beam failure. A first is a hypothetical PDCCH Block Error Rate (BLER), and a second is Layer 1 Reference Signal Received Power (L1-RSRP). The L1-RSRP is easier to measure and measuring the L1-RSRP does not require estimating the interference level received from the UE. As the interference level received from the UE may fluctuate significantly in time and is very sensitive, especially for the case that the interference signal is spatially directional (directional interference that comes and goes quickly), measurement and estimation of interference level received from the UE is complicated and adds a lot of implementation complexity. Furthermore, the accuracy of the estimation is not robust. In this sense, use of L1-RSRP as the signal quality measure can decrease the implementation complexity. However, because the L1-RSRP does not take into consideration some of the capabilities of the UE, such as noise figure, UE Tx or Rx processing gain, and so forth, the L1-RSRP may not correctly reflect UE capability dependent performance measures.

Here, the noise figure is a noise factor expressed in dB scale, wherein the noise factor of a device is specified with noise from a noise source at room temperature ($N_{in}=kT$), where k is Boltzman's constant and T is approximately room temperature in Kelvin degrees, and kT is approximately −174 dBm/Hz at room temperature. On the other hand, the hypothetical PDCCH BLER directly represents signal to interference plus noise ratio (SINR) of the received signal, which considers interference level and includes adjustments for UE related capabilities. In this sense, the hypothetical PDCCH BLER can represent the received signal quality more accurately. However, it requires additional measurements and the estimation of interference level, which increases implementation complexity.

According to an example embodiment, a UE uses a hybrid signal quality measure for beam failure detection, where UE capabilities are considered and measurement and estimation of interference level is not needed.

In an embodiment, a UE uses an adjusted L1-RSRP as a signal quality measure for beam failure detection. For the UE to declare the beam failure detected, the UE needs to combine the L1-RSRP together with UE capabilities. The UE capabilities include, but not limited to, a noise figure, UE Tx or Rx processing gain, and so forth.

In an embodiment, the adjusted L1-RSRP (denoted A_RSRP) is expressible as $$A\_RSRP = L1\text{-}RSRP + \sum_{n=1}^{N_a} s(n) \cdot Adj(n),$$

where:
$N_a$ is a number of adjustments considered in calculating A_RSRP,
s(n) is the sign of the n-th adjustment, where the sign can be either + or −, and
Adj(n) is the value of the n-th adjustment shown in dB scale.

In an embodiment, the UE's noise figure is used as one of the adjustment value (Adj(n)). In another embodiment, the UE's Tx or Rx processing gain is used as one of the adjustment value. In another embodiment, both the UE's noise figure and the UE's Tx or Rx processing gain is used for each of adjustment value (Adj(1) and Adj(2), respectively). Use of extra adjustments other than the UE's noise figure and the UE's Tx or Rx processing gain is also available.

In one embodiment, a UE uses a hypothetical PDCCH performance as a signal quality measure for beam failure detection. For the UE to declare the beam failure detected, the UE determines or calculates a SINR of a received signal, where an interference level of the received signal is assumed to be a predetermined value. Therefore, the UE does not need to measure and estimate interference level of the received signal.

In an embodiment, the hypothetical PDCCH performance (denoted SINR_PDCCH) is expressible as $$SINR\_PDCCH = S/(N_0 + I_0),$$

where:
S is the received signal power level measured in linear scale,
$N_0$ is the noise power level measured in linear scale, and
$I_0$ is the predetermined interference level.

In an embodiment, $I_0$ is considered to be zero (0). In another embodiment, a fixed value is used for $I_0$. In another embodiment, an averaged interference value measured prior to receiving the signal is used for $I_0$.

According to an example embodiment, systems and methods, where an access node, after receiving a BRACH preamble from a UE, specifies to the UE that the access node has scheduled a follow-up message exchange for beam failure recovery purposes are provided. The follow-up message exchange may be performed when the access node needs additional information. Hence, if the access node does not need additional information, the follow-up message exchange is not performed.

According to an example embodiment, an access node requests a follow-up message exchange when additional detailed beam information is needed.

Figure 5A:
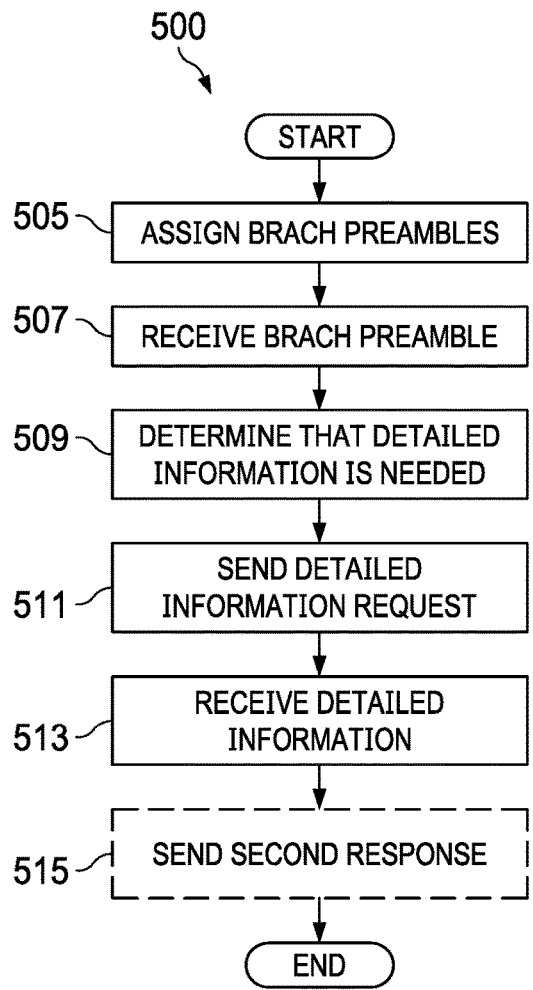
FIG. 5A illustrates a flow diagram of example operations occurring in an access node participating in a beam failure recovery process requests a follow-up message exchange to acquire additional detailed beam information according to example embodiments described herein.

FIG. 5A illustrates a flow diagram of example operations 500 occurring in an access node participating in a beam failure recovery process requests a follow-up message exchange to acquire additional detailed beam information. Operations 500 may be indicative of operations occurring in an access node as the access node participates in a beam failure recovery process.

Operations 500 begin with the access node assigning BRACH preambles to UEs (block 505). The access node may specify to the UEs which BRACH preambles have been assigned to which UEs. As an example, the access node may send unicast messages to each UE with the one or more BRACH preambles assigned to each UE. As another example, the access node may broadcast a message to a plurality of UEs with BRACH preamble assignments for the UEs of the plurality of UEs. Alternatively, the assignment of BRACH preambles may be specified in a technical standard or by an operator of the communications system. The access node receives a BRACH preamble in a BRACH resource in a BRACH region from a UE (block 507). The access node processes the BRACH preamble and determines that detailed beam information is needed (block 509). The access node sends a request for detailed beam information (block 511). The request may be sent in a first response. As an example, the request may be in the form of information, such as a flag or one or more bits set to a first specified value, to request the detailed beam information. In an embodiment, if the information is set to another value, such as a numerical or binary zero, the access node is not requesting detailed beam information. The first response may also include resource allocation information specifying network resources the UE is to use to send the detailed beam information. The access node receives the detailed beam information (block 513). The detailed beam information may be received in the network resources specified by the resource allocation information. The access node may send a second response (block 515).

In an embodiment, the detailed beam information may include received signal quality information of the candidate beam corresponding to the BRACH preamble in the BRACH resource of the BRACH region. The detailed beam information may include RSRP information of the candidate beam corresponding to the BRACH preamble in the BRACH resource of the BRACH region. The detailed beam information may include RSRQ information or SINR or SNR information of the candidate beam corresponding to the BRACH preamble in the BRACH resource of the BRACH region. In another embodiment, the detailed beam information may include information to initiate a beam management, a beam report, or beam refinement procedure with the UE. In yet another embodiment, the detailed beam information may include detailed information on a CSI-RS that the UE selected as a candidate beam or a CSI-RS Resource Indicator (CRI) of the CSI-RS that the UE selected as a candidate beam.

The BRACH preamble received by the access node may represent or identifies a reference signal block identification of the candidate beam. The BRACH preamble received by the access node may represent or identify a CSI-RS beam identification of the candidate beam. As an example, the specific BRACH preamble represents or identifies the reference signal block identification or the CSI-RS beam identification. As another example, a position of the BRACH preamble in a plurality of BRACH preambles allocated to the UE represents or identifies the reference signal block identification or the CSI-RS beam identification.

After receiving the BRACH preamble in block 507, the access node may send a first response to the UE. After receiving the detailed beam information, the access node may initiate a beam management, beam report, or beam refinement procedure with the UE by sending a second response to the UE.

In an embodiment, if the access node sends information conveying that the detailed beam information is not requested (such as in block 511, for example), a PDCCH is used to carry the first response. However, if the access node sends information conveying that the detailed beam information is requested, a PDCCH and a physical downlink shared channel (PDSCH) are used to carry the first response. In such a situation, the PDCCH conveys resource allocation information specifying network resources for the PDSCH, and the PDSCH carries the information conveying that the detailed beam information is requested. In another embodiment, a payload size of the PDCCH when the access node sends information conveying that the detailed beam information is not requested and a payload size of the PDCCH when the access node sends information conveying that the detailed beam information is requested are the same (equal).

It is noted that if the access node requests (in the first response) detailed beam information (e.g., block 509), the first response may also include information conveying that the access node is initiating beam management, beam report, or beam refinement procedures with the UE. In an embodiment, information requesting the detailed beam information and information conveying that the access node is initiating beam management, beam report, or beam refinement procedures may be the same. In other words, the request for detailed beam information also conveys that the access node is initiating beam management, beam report, or beam refinement procedures, and vice versa. It is noted that if the access node specifies that the detailed beam information is not needed (e.g., in block 509), operations 500 terminate.

Figure 5B:
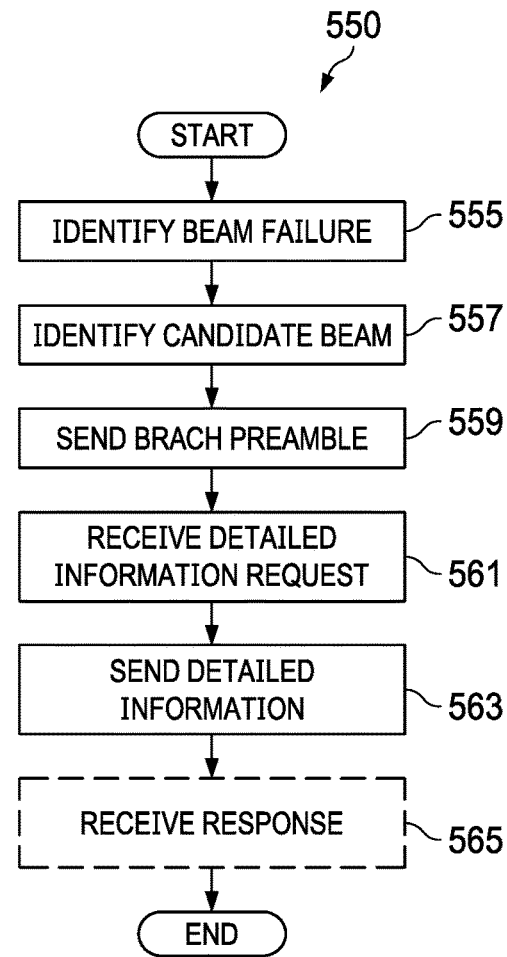
FIG. 5B illustrates a flow diagram of example operations occurring in a UE participating in a beam failure recovery where a follow-up message exchange to acquire additional detailed beam information is needed according to example embodiments described herein.

FIG. 5B illustrates a flow diagram of example operations 550 occurring in a UE participating in a beam failure recovery where a follow-up message exchange to acquire additional detailed beam information is needed. Operations 550 may be indicative of operations occurring in a UE as the UE participates in a beam failure recovery where a follow-up message exchange to acquire additional detailed beam information is needed.

Operations 550 begin with the UE identifying a beam failure (block 555). The UE identifies a candidate beam (block 557). The UE sends a BRACH preamble in a BRACH resource of a BRACH region that corresponds to the candidate beam (block 559). The UE receives a request for detailed beam information (block 561). The request may be received in a first response sent by the access node. As an example, the request may be in the form of a flag or one or more bits set to a first specified value to request the detailed beam information. In an embodiment, if the flag or the one or more bits is set to another value, such as a numerical or binary zero, the access node is not requesting detailed beam information. The first response may also include resource allocation information specifying network resources the UE is to use to send the detailed beam information. The UE sends the detailed beam information to the access node (block 563). The detailed beam information may be sent in the network resources specified by the resource allocation information. The UE may receive a second response from the access node (block 565). It is noted that if the UE receives information conveying that detailed beam information is not needed, operations 550 terminate.

According to an example embodiment, an access node requests a follow-up message exchange when additional detailed beam information regarding a CSI-RS beam is needed.

Figure 6A:
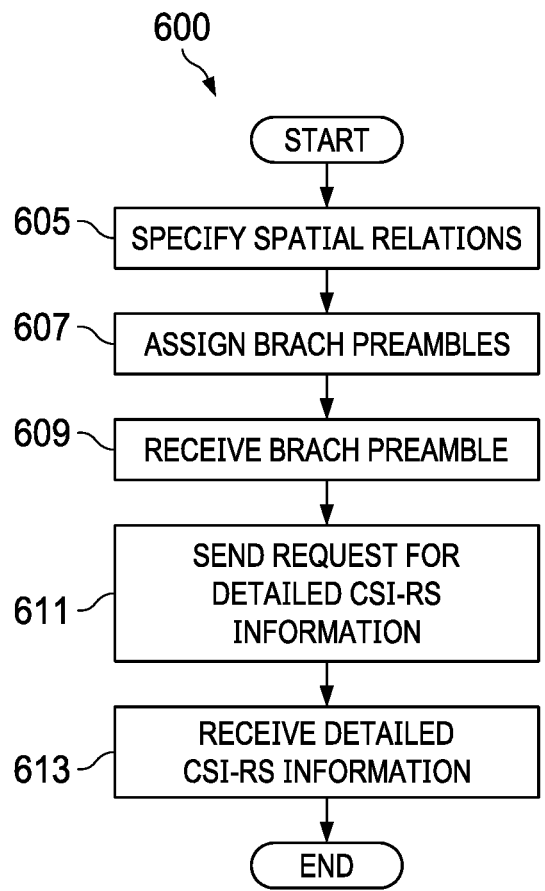
FIG. 6A illustrates a flow diagram of example operations occurring in an access node participating in a beam failure recovery process requests a follow-up message exchange to acquire additional detailed beam information regarding a CSI-RS beam according to example embodiments described herein.

FIG. 6A illustrates a flow diagram of example operations 600 occurring in an access node participating in a beam failure recovery process requests a follow-up message exchange to acquire additional detailed beam information regarding a CSI-RS beam. Operations 600 may be indicative of operations occurring in an access node as the access node participates in a beam failure recovery process.

Operations 600 begin with the access node specifying spatial relations between one or more reference signal blocks and one or more CSI-RS beams (block 605). The access node assigns BRACH preambles to UEs (block 607). The access node may specify to the UEs which BRACH preambles have been assigned to which UEs. As an example, the access node may send unicast messages to each UE with the one or more BRACH preambles assigned to each UE. As another example, the access node may broadcast a message to a plurality of UEs with BRACH preamble assignments for the UEs of the plurality of UEs. Alternatively, the assignment of BRACH preambles may be specified in a technical standard or by an operator of the communications system. The access node receives a BRACH preamble in a BRACH resource in a BRACH region from a UE (block 609). The access node processes the BRACH preamble and sends a request for detailed beam information regarding a CSI-RS beam selected by the UE (block 611). The request may be sent in a first response. The first response may also include resource allocation information specifying network resources the UE is to use to send the detailed beam information. The access node receives the detailed beam information (block 613). The detailed beam information may be received in the network resources specified by the resource allocation information.

In an embodiment, the detailed beam information on the CSI-RS beam may include:
A CRI of the CSI-RS beam;
An index of the CSI-RS beam within the reference signal block;
A received signal quality of the CSI-RS beam;
A RSRP of the CSI-RS beam; or
A RSRQ or SINR or SNR of the CSI-RS beam.

In an embodiment, the access node may send a second response to the UE after receiving the detailed beam information. In an embodiment, the access node identifies that a beam failure has occurred at the UE. In an embodiment, the access node specifies that further CSI-RS information is required when the received signal quality (or some other representation of signal quality) of the BRACH preamble is below a specified threshold.

In an embodiment, after receiving the detailed beam information on the CSI-RS beam, if the access node requested further CSI-RS information, the access node may send a second response to the UE on a beam that is spatially quasi-co-located (QCLed) to the reference signal beam. QCL defines a relationship between two reference signals or data signals such that the two signals may be viewed as possessing similar characteristics. The spatial QCL information may include associations between CSI-RS resources and reference signals, or associations between individual reference signals, or associations between CSI-RS resources and BRACH channels. The second response may initiate a beam management, a beam report, or a beam refinement procedure.

In an embodiment, if the access node requests further CSI-RS information, the first response also comprises information conveying that the access node initiates a beam management, a beam report, or beam refinement procedure with the UE. In an embodiment, information requesting the detailed beam information and information conveying that the access node is initiating beam management, beam report, or beam refinement procedures may be the same. In other words, the request for detailed beam information also conveys that the access node is initiating beam management, beam report, or beam refinement procedures, and vice versa.

In an embodiment, an access node specifies to a UE if a BRACH preamble received at a BRACH resource of a BRACH region represents the candidate reference signal block index or CSI-RS index of the UE. If the access node specifies that a BRACH preamble received at a BRACH resource of a BRACH region represents the candidate reference signal block index of the UE, the access node assigns the UE one BRACH preamble per BRACH resource or region. If the access node specifies that a BRACH preamble received at a BRACH resource of a BRACH region represents the candidate CSI-RS index, the access node assigns the UE one or more BRACH preambles per BRACH resource or region.

Figure 6B:
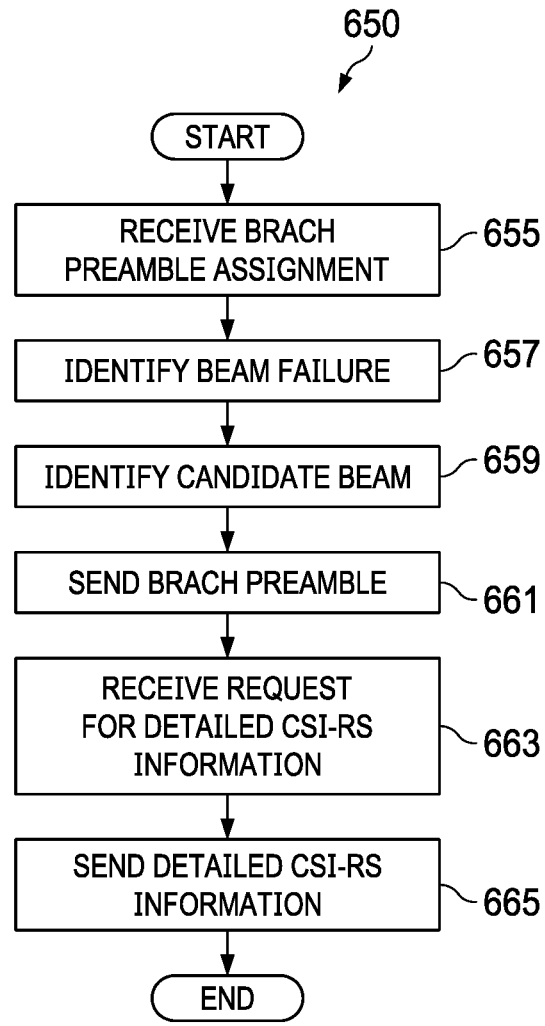
FIG. 6B illustrates a flow diagram of example operations occurring in a UE participating in a beam failure recovery where a follow-up message exchange to acquire additional detailed beam information regarding a CSI-RS beam is needed according to example embodiments described herein.

FIG. 6B illustrates a flow diagram of example operations 650 occurring in a UE participating in a beam failure recovery where a follow-up message exchange to acquire additional detailed beam information regarding a CSI-RS beam is needed. Operations 650 may be indicative of operations occurring in a UE as the UE participates in a beam failure recovery where a follow-up message exchange to acquire additional detailed beam information regarding a CSI-RS beam is needed.

Operations 650 begin with the UE receiving a BRACH preamble assignment (block 655). The UE identifies a beam failure (block 657). The UE identifies a candidate beam (block 659). The UE sends a BRACH preamble in a BRACH resource of a BRACH region that corresponds to the candidate beam (block 661). The UE receives a request for detailed beam information regarding a CSI-RS beam (block 663). The request may be received in a first response sent by the access node. The first response may also include resource allocation information specifying network resources the UE is to use to send the detailed beam information. The UE sends the detailed beam information to the access node (block 665). In an embodiment, the UE may also receive a second response requesting further CSI-RS information.

According to an example embodiment, an access node requests a follow-up message exchange when additional detailed beam information regarding additional CRI information is needed.

Figure 7A:
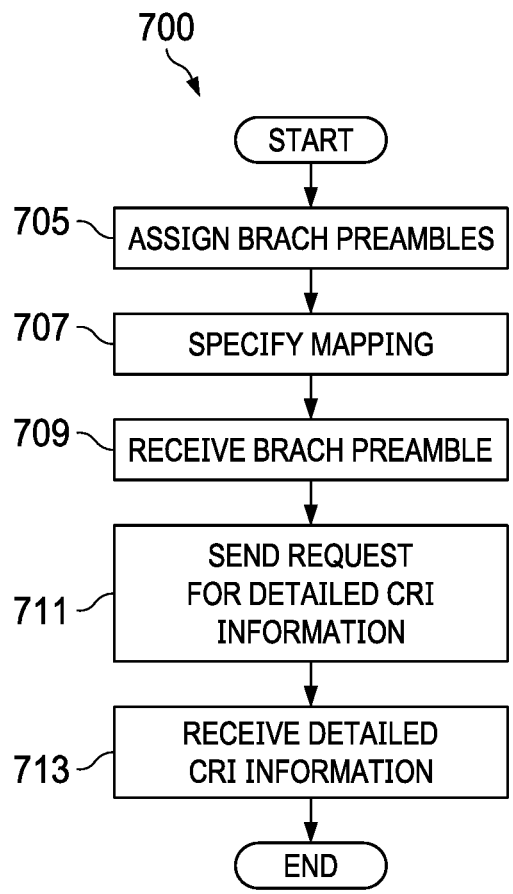
FIG. 7A illustrates a flow diagram of example operations occurring in an access node participating in a beam failure recovery process requests a follow-up message exchange to acquire additional detailed beam information regarding a candidate CSI-RS beam according to example embodiments described herein.

FIG. 7A illustrates a flow diagram of example operations 700 occurring in an access node participating in a beam failure recovery process requests a follow-up message exchange to acquire additional detailed beam information regarding a candidate CSI-RS beam. Operations 700 may be indicative of operations occurring in an access node as the access node participates in a beam failure recovery process.

Operations 700 begin with the access node assigning BRACH preambles to UEs (block 705). The access node specifies mappings between each BRACH preamble assigned to a UE and candidate CSI-RS beams (block 707). There are one or more CSI-RS beams mapped to each BRACH preamble. The access node may specify to the UEs which BRACH preambles have been assigned to which UEs. Alternatively, the assignment of BRACH preambles may be specified in a technical standard or by an operator of the communications system. The access node receives a BRACH preamble in a BRACH resource in a BRACH region from a UE (block 709). The access node processes the BRACH preamble and sends a request for detailed beam information regarding a candidate CSI-RS beam selected by the UE (block 711). The request may be sent in a first response. The first response may also include resource allocation information specifying network resources the UE is to use to send the detailed beam information. The access node receives the detailed beam information (block 713). The detailed beam information may be received in the network resources specified by the resource allocation information.

In an embodiment, the detailed beam information on the CSI-RS beam may include:

A CRI of the candidate CSI-RS beam;
An index of the candidate CSI-RS beam within the received BRACH preamble;
A received signal quality of the CSI-RS beam;
A RSRP of the candidate CSI-RS beam; or
A RSRQ or SINR or SNR of the candidate CSI-RS beam.

In an embodiment, the access node may send a second response to the UE after receiving the detailed beam information. In an embodiment, the access node identifies that a beam failure has occurred at the UE. In an embodiment, after receiving the detailed beam information on the candidate CSI-RS beam, if the access node requests further candidate CSI-RS beam information, the access node may send a second response to the UE on a beam that is spatially QCLed to the candidate CSI-RS beam. The second response may initiate a beam management, beam report, or a beam refinement procedure.

In an embodiment, if the access node requests further candidate CSI-RS beam information, the first response also comprises information conveying that the access node is initiating a beam management, beam report, or beam refinement procedure with the UE. In an embodiment, information requesting the detailed beam information and information conveying that the access node is initiating beam management, beam report, or beam refinement procedures may be the same. In other words, the request for detailed beam information also conveys that the access node is initiating beam management, beam report, or beam refinement procedures, and vice versa.

Figure 7B:
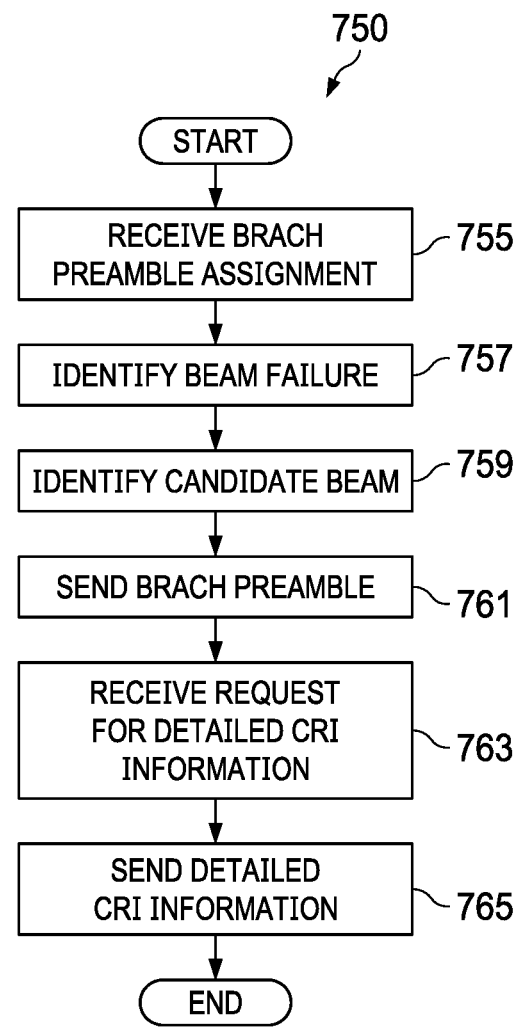
FIG. 7B illustrates a flow diagram of example operations occurring in a UE participating in a beam failure recovery where a follow-up message exchange to acquire additional detailed beam information regarding a candidate CSI-RS beam is needed according to example embodiments described herein.

FIG. 7B illustrates a flow diagram of example operations 750 occurring in a UE participating in a beam failure recovery where a follow-up message exchange to acquire additional detailed beam information regarding a candidate CSI-RS beam is needed. Operations 750 may be indicative of operations occurring in a UE as the UE participates in a beam failure recovery where a follow-up message exchange to acquire additional detailed beam information regarding a candidate CSI-RS beam is needed.

Operations 750 begin with the UE receiving a BRACH preamble assignment (block 755). The UE identifies a beam failure (block 757). The UE identifies a candidate beam (block 759). The UE sends a BRACH preamble in a BRACH resource of a BRACH region that corresponds to the candidate beam (block 761). The UE receives a request for detailed beam information regarding a candidate CSI-RS beam (block 763). The request may be received in a first response sent by the access node. The first response may also include resource allocation information specifying network resources the UE is to use to send the detailed beam information. The UE sends the detailed beam information to the access node (block 765). In an embodiment, the UE may also receive a second response with information conveying that further CRI information is required.

Figure 8:
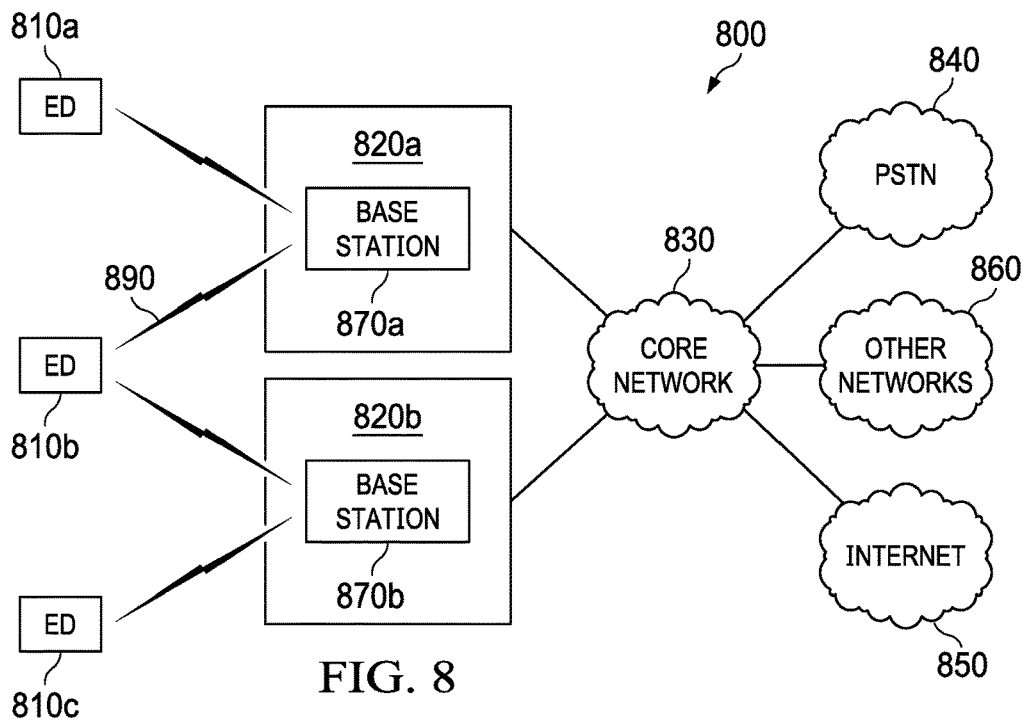
FIG. 8 illustrates an example communication system according to example embodiments described herein.

FIG. 8 illustrates an example communication system 800. In general, the system 800 enables multiple wireless or wired users to transmit and receive data and other content. The system 800 may implement one or more channel access methods, such as code division multiple access (CDMA), time division multiple access (TDMA), frequency division multiple access (FDMA), orthogonal FDMA (OFDMA), single-carrier FDMA (SC-FDMA), or non-orthogonal multiple access (NOMA).

In this example, the communication system 800 includes electronic devices (ED) 810a-810c, radio access networks (RANs) 820a-820b, a core network 830, a public switched telephone network (PSTN) 840, the Internet 850, and other networks 860. While certain numbers of these components or elements are shown in FIG. 8, any number of these components or elements may be included in the system 800.

The EDs 810a-810c are configured to operate or communicate in the system 800. For example, the EDs 810a-810c are configured to transmit or receive via wireless or wired communication channels. Each ED 810a-810c represents any suitable end user device and may include such devices (or may be referred to) as a user equipment or device (UE), wireless transmit or receive unit (WTRU), mobile station, fixed or mobile subscriber unit, cellular telephone, personal digital assistant (PDA), smartphone, laptop, computer, touchpad, wireless sensor, or consumer electronics device.

The RANs 820a-820b here include base stations 870a-870b, respectively. Each base station 870a-870b is configured to wirelessly interface with one or more of the EDs 810a-810c to enable access to the core network 830, the PSTN 840, the Internet 850, or the other networks 860. For example, the base stations 870a-870b may include (or be) one or more of several well-known devices, such as a base transceiver station (BTS), a Node-B (NodeB), an evolved NodeB (eNodeB), a Home NodeB, a Home eNodeB, a site controller, an access point (AP), or a wireless router. The EDs 810a-810c are configured to interface and communicate with the Internet 850 and may access the core network 830, the PSTN 840, or the other networks 860.

In the embodiment shown in FIG. 8, the base station 870a forms part of the RAN 820a, which may include other base stations, elements, or devices. Also, the base station 870b forms part of the RAN 820b, which may include other base stations, elements, or devices. Each base station 870a-870b operates to transmit or receive wireless signals within a particular geographic region or area, sometimes referred to as a "cell." In some embodiments, multiple-input multiple-output (MIMO) technology may be employed having multiple transceivers for each cell.

The base stations 870a-870b communicate with one or more of the EDs 8100a-810c over one or more air interfaces 890 using wireless communication links. The air interfaces 890 may utilize any suitable radio access technology.

It is contemplated that the system 800 may use multiple channel access functionality, including such schemes as described above. In particular embodiments, the base stations and EDs implement LTE, LTE-A, or LTE-B. Of course, other multiple access schemes and wireless protocols may be utilized.

The RANs 820a-820b are in communication with the core network 830 to provide the EDs 810a-810c with voice, data, application, Voice over Internet Protocol (VoIP), or other services. Understandably, the RANs 820a-820b or the core network 830 may be in direct or indirect communication with one or more other RANs (not shown). The core network 830 may also serve as a gateway access for other networks (such as the PSTN 840, the Internet 850, and the other networks 860). In addition, some or all of the EDs 810a-810c may include functionality for communicating with different wireless networks over different wireless links using different wireless technologies or protocols. Instead of wireless communication (or in addition thereto), the EDs may communicate via wired communication channels to a service provider or switch (not shown), and to the Internet 850.

Although FIG. 8 illustrates one example of a communication system, various changes may be made to FIG. 8. For example, the communication system 800 could include any number of EDs, base stations, networks, or other components in any suitable configuration.

Figure 9A:
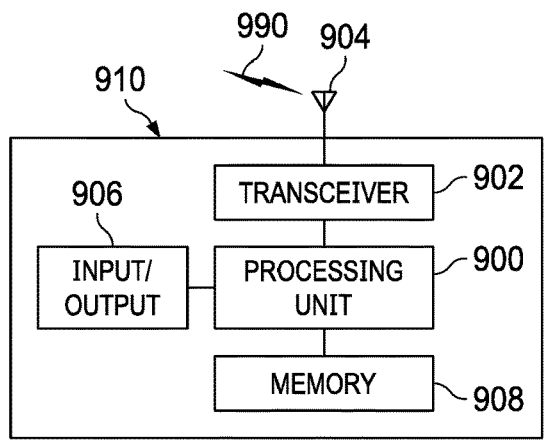
FIGS. 9A and 9B illustrate example devices that may implement the methods and teachings according to this disclosure.
Figure 9B:
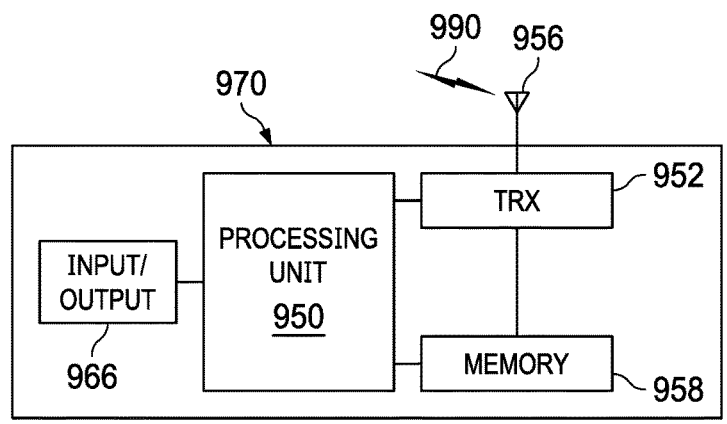

FIGS. 9A and 9B illustrate example devices that may implement the methods and teachings according to this disclosure. In particular, FIG. 9A illustrates an example ED 910, and FIG. 9B illustrates an example base station 970. These components could be used in the system 800 or in any other suitable system.

As shown in FIG. 9A, the ED 910 includes at least one processing unit 900. The processing unit 900 implements various processing operations of the ED 910. For example, the processing unit 900 could perform signal coding, data processing, power control, input/output processing, or any other functionality enabling the ED 910 to operate in the system 800. The processing unit 900 also supports the methods and teachings described in more detail above. Each processing unit 900 includes any suitable processing or computing device configured to perform one or more operations. Each processing unit 900 could, for example, include a microprocessor, microcontroller, digital signal processor, field programmable gate array, or application specific integrated circuit.

The ED 910 also includes at least one transceiver 902. The transceiver 902 is configured to modulate data or other content for transmission by at least one antenna or NIC (Network Interface Controller) 904. The transceiver 902 is also configured to demodulate data or other content received by the at least one antenna 904. Each transceiver 902 includes any suitable structure for generating signals for wireless or wired transmission or processing signals received wirelessly or by wire. Each antenna 904 includes any suitable structure for transmitting or receiving wireless or wired signals. One or multiple transceivers 902 could be used in the ED 910, and one or multiple antennas 904 could be used in the ED 910. Although shown as a single functional unit, a transceiver 902 could also be implemented using at least one transmitter and at least one separate receiver.

The ED 910 further includes one or more input/output devices 906 or interfaces (such as a wired interface to the Internet 850). The input/output devices 906 facilitate interaction with a user or other devices (network communications) in the network. Each input/output device 906 includes any suitable structure for providing information to or receiving or providing information from a user, such as a speaker, microphone, keypad, keyboard, display, or touch screen, including network interface communications.

In addition, the ED 910 includes at least one memory 908. The memory 908 stores instructions and data used, generated, or collected by the ED 910. For example, the memory 908 could store software or firmware instructions executed by the processing unit(s) 900 and data used to reduce or eliminate interference in incoming signals. Each memory 908 includes any suitable volatile or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 9B, the base station 970 includes at least one processing unit 950, at least one transceiver 952, which includes functionality for a transmitter and a receiver, one or more antennas 956, at least one memory 958, and one or more input/output devices or interfaces 966. A scheduler, which would be understood by one skilled in the art, is coupled to the processing unit 950. The scheduler could be included within or operated separately from the base station 970. The processing unit 950 implements various processing operations of the base station 970, such as signal coding, data processing, power control, input/output processing, or any other functionality. The processing unit 950 can also support the methods and teachings described in more detail above. Each processing unit 950 includes any suitable processing or computing device configured to perform one or more operations. Each processing unit 950 could, for example, include a microprocessor, microcontroller, digital signal processor, field programmable gate array, or application specific integrated circuit.

Each transceiver 952 includes any suitable structure for generating signals for wireless or wired transmission to one or more EDs or other devices. Each transceiver 952 further includes any suitable structure for processing signals received wirelessly or by wire from one or more EDs or other devices. Although shown combined as a transceiver 952, a transmitter and a receiver could be separate components. Each antenna 956 includes any suitable structure for transmitting or receiving wireless or wired signals. While a common antenna 956 is shown here as being coupled to the transceiver 952, one or more antennas 956 could be coupled to the transceiver(s) 952, allowing separate antennas 956 to be coupled to the transmitter and the receiver if equipped as separate components. Each memory 958 includes any suitable volatile or non-volatile storage and retrieval device(s). Each input/output device 966 facilitates interaction with a user or other devices (network communications) in the network. Each input/output device 966 includes any suitable structure for providing information to or receiving or providing information from a user, including network interface communications.

Figure 10:
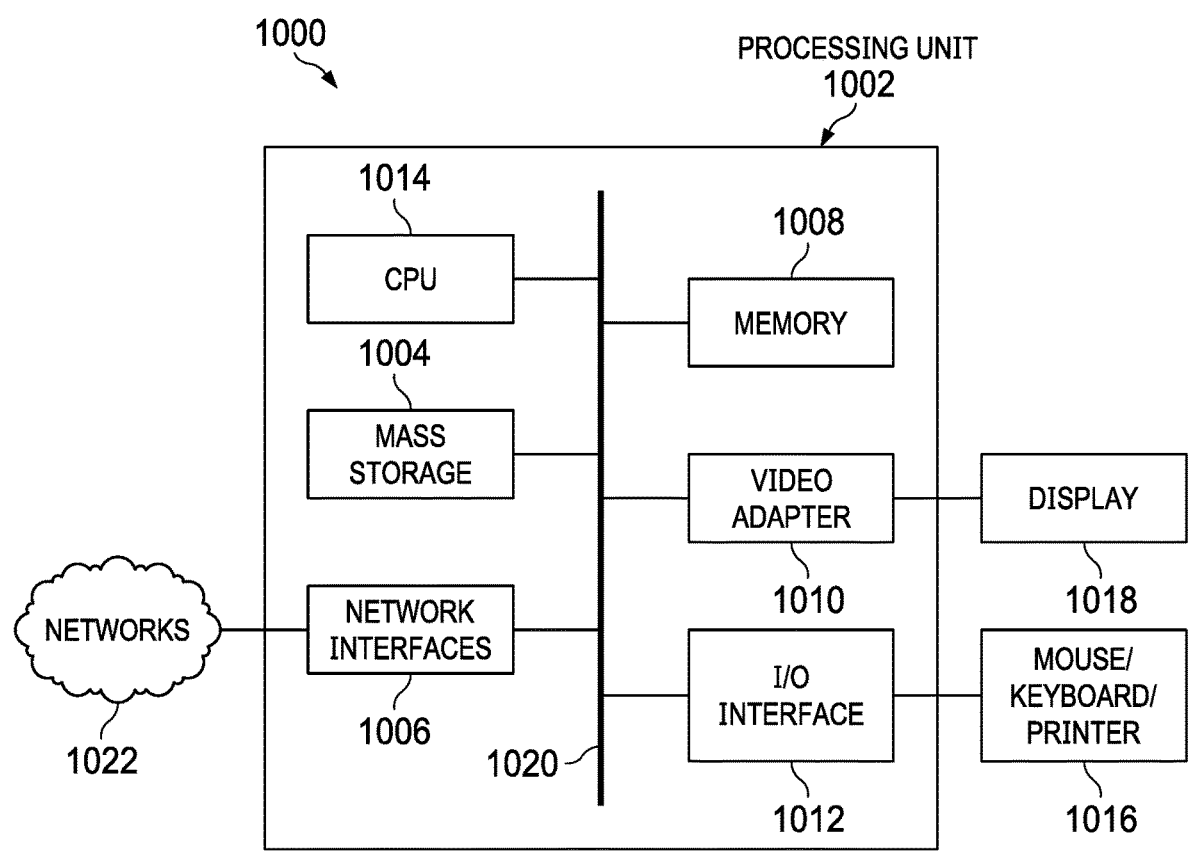
FIG. 10 is a block diagram of a computing system that may be used for implementing the devices and methods disclosed herein.

FIG. 10 is a block diagram of a computing system 1000 that may be used for implementing the devices and methods disclosed herein. For example, the computing system can be any entity of UE, access network (AN), mobility management (MM), session management (SM), user plane gateway (UPGW), or access stratum (AS). Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 1000 includes a processing unit 1002. The processing unit includes a central processing unit (CPU) 1014, memory 1008, and may further include a mass storage device 1004, a video adapter 1010, and an I/O interface 1012 connected to a bus 1020.

The bus 1020 may be one or more of any type of several bus architectures including a memory bus or memory controller, a peripheral bus, or a video bus. The CPU 1014 may comprise any type of electronic data processor. The memory 1008 may comprise any type of non-transitory system memory such as static random access memory (SRAM), dynamic random access memory (DRAM), synchronous DRAM (SDRAM), read-only memory (ROM), or a combination thereof. In an embodiment, the memory 1008 may include ROM for use at boot-up, and DRAM for program and data storage for use while executing programs.

The mass storage 1004 may comprise any type of non-transitory storage device configured to store data, programs, and other information and to make the data, programs, and other information accessible via the bus 1020. The mass storage 1004 may comprise, for example, one or more of a solid state drive, hard disk drive, a magnetic disk drive, or an optical disk drive.

The video adapter 1010 and the I/O interface 1012 provide interfaces to couple external input and output devices to the processing unit 1002. As illustrated, examples of input and output devices include a display 1018 coupled to the video adapter 1010 and a mouse, keyboard, or printer 1016 coupled to the I/O interface 1012. Other devices may be coupled to the processing unit 1002, and additional or fewer interface cards may be utilized. For example, a serial interface such as Universal Serial Bus (USB) (not shown) may be used to provide an interface for an external device.

The processing unit 1002 also includes one or more network interfaces 1006, which may comprise wired links, such as an Ethernet cable, or wireless links to access nodes or different networks. The network interfaces 1006 allow the processing unit 1002 to communicate with remote units via the networks. For example, the network interfaces 1006 may provide wireless communication via one or more transmitters or transmit antennas and one or more receivers or receive antennas. In an embodiment, the processing unit 1002 is coupled to a local-area network 1022 or a wide-area network for data processing and communications with remote devices, such as other processing units, the Internet, or remote storage facilities.

Figure 11:
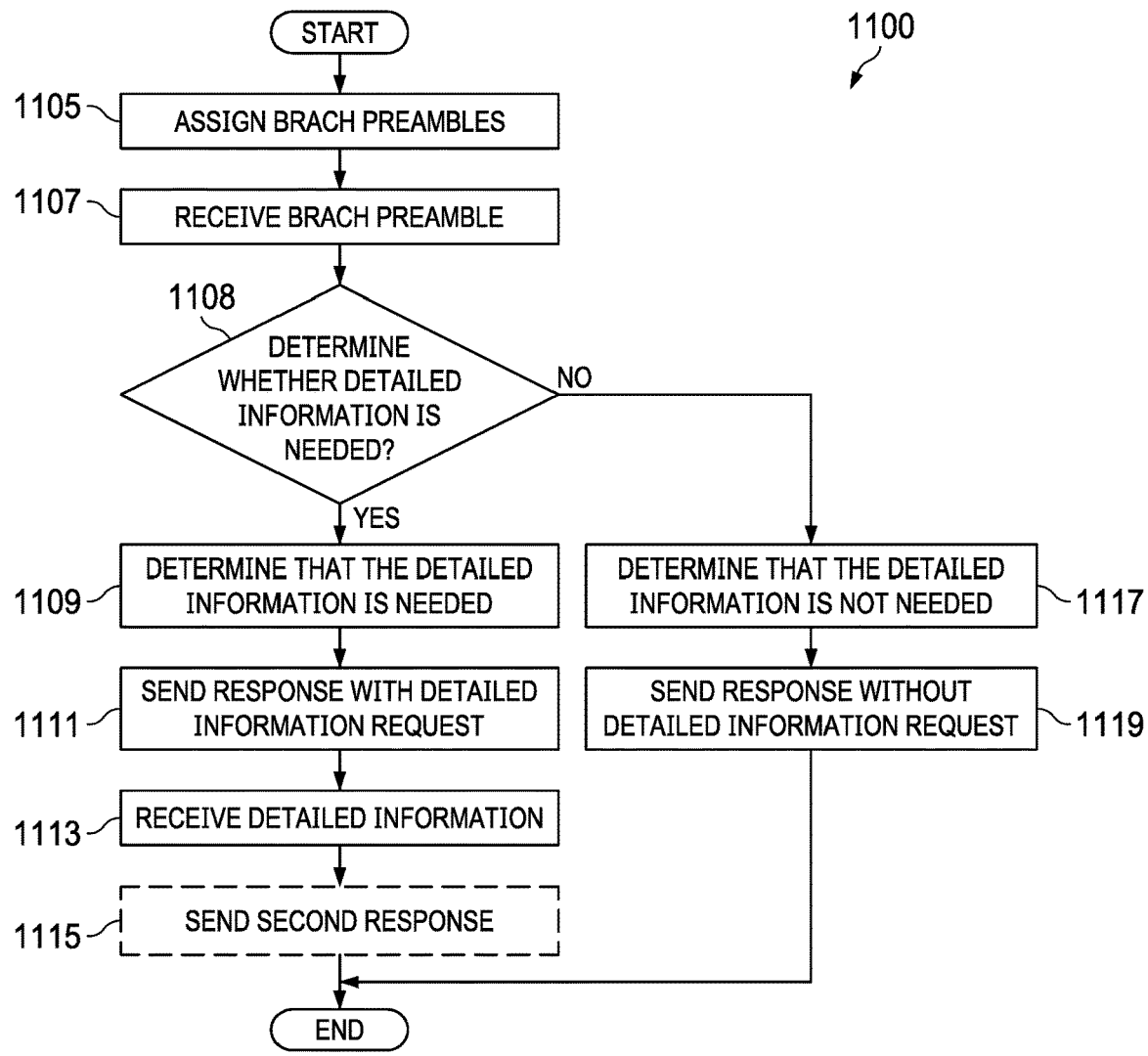
FIG. 11 illustrates a flow diagram of example operations occurring in an access node participating in a beam failure recovery process.

FIG. 11 illustrates a flow diagram of example operations 1100 occurring in an access node participating in a beam failure recovery process. In a first alternative, the access node requests a follow-up message exchange to acquire additional detailed beam information in response to a received BRACH preamble, and, in a second alternative, does not request a follow-up message exchange in response to the received BRACH preamble. Operations 1100 may be indicative of operations occurring in an access node as the access node participates in a beam failure recovery process.

In more detail, operations 1100 begin with the access node assigning BRACH preambles to UEs (block 1105). The access node may specify to the UEs which BRACH preambles have been assigned to which UEs. As an example, the access node may send unicast messages to each UE with the one or more BRACH preambles assigned to each UE. As another example, the access node may broadcast a message to a plurality of UEs with BRACH preamble assignments for the UEs of the plurality of UEs. Alternatively, the assignment of BRACH preambles may be specified in a technical standard or by an operator of the communications system. The access node receives a first BRACH preamble in a BRACH resource in a BRACH region from a first UE (block 1107). The access node processes the first BRACH preamble and determines that whether detailed beam information is needed (block 1108). The access node determines that detailed beam information is needed (block 1109). The access node sends a response with a detailed information request (block 1111). As an example, the detailed information request may be in the form of information, such as a flag or one or more bits set to a first specified value, to request the detailed beam information. In an embodiment, if the information is set to another value, such as a numerical or binary zero, the access node is not requesting detailed beam information. The response with the detailed information request may also include resource allocation information specifying network resources the first UE is to use to send the detailed beam information. The access node receives the detailed beam information (block 1113). The detailed beam information may be received in the network resources specified by the resource allocation information. The access node may send a second response (block 1115).

In a second path, the access node determines that detailed beam information is not needed (block 1117). The access node sends a response to the BRACH preamble (block 1119). The response may be in the form of information, such as a flag or one or more bits, that when set to another value (e.g., a second value), such as a numerical or binary zero, the access node is not requesting detailed beam information.

Figure 12:
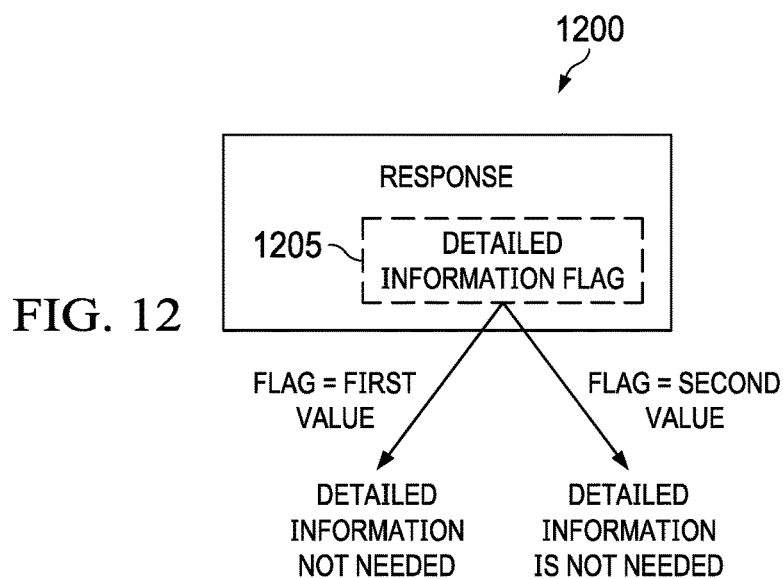
FIG. 12 illustrates an example response transmitted by an access node in response to a received BRACH preamble.

FIG. 12 illustrates an example response 1200. Response 1200 is an example of a response transmitted by an access node in response to a received BRACH preamble. Response 1200 includes a detailed information flag 1205. In an embodiment, if detailed information flag 1205 is set to a first value, response 1200 is a request for detailed beam information. In an embodiment, if detailed information flag 1205 is set to a second value, response 1200 is not a request for detailed beam information.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by an indicating unit/module, an applying unit/module, or an identifying unit/module. The respective units/modules may be hardware, software, or a combination thereof. For instance, one or more of the units/modules may be an integrated circuit, such as field programmable gate arrays (FPGAs) or application-specific integrated circuits (ASICs).

Although the present disclosure and its advantages have been described in detail, it should be understood that various changes, substitutions and alterations can be made herein without departing from the spirit and scope of the disclosure as defined by the appended claims.

What is claimed is:

1. A computer implemented method for operating an access node, the method comprising:
   receiving, by the access node from a user equipment (UE) via a first random access resource, a first random access preamble that indicates a beam failure recovery request, the first random access preamble and the first random access resource at least partially identifying a first beam selected by the UE, and the first random access resource being one of a plurality of random access resources assigned to the UE;

identifying a beam failure in accordance with the beam failure recovery request;

determining whether first additional information about the first beam is needed; and based on the access node needing the first additional information about the first beam:

sending, by the access node to the UE, a first message responsive to the first random access preamble, the first message including one or more first bits set to request the first additional information about the first beam, and receiving, by the access node from the UE, a second message including the first additional information about the first beam.

2. The method of claim 1, wherein the first random access preamble and a position of the first random access resource in the plurality of random access resources identify the first beam selected by the UE.

3. The method of claim 1, wherein the one or more first bits are set to a first value to request the first additional information about the first beam, and a second value of the one or more first bits configured to indicate that the first additional information about the first beam is not requested.

4. The method of claim 3, wherein the second value is a zero value.

5. The method of claim 1, wherein the first additional information about the first beam comprises at least one of channel quality information of the first beam, a beam index of a beam failure reference signal carried by the first beam, or a channel state information reference signal (CSI-RS) resource index (CRI) of the first beam.

6. The method of claim 5, wherein the first additional information about the first beam comprises the channel quality information of the first beam, and wherein the channel quality information of the first beam comprises at least one of a reference signal received power (RSRP) of the first beam, a reference signal received quality (RSRQ) of the first beam, a signal plus interference to noise ratio (SINR) of the first beam, or a signal to noise ratio (SNR) of the first beam.

7. The method of claim 1, wherein the first random access preamble is one of a plurality of random access preambles assigned to the UE.

8. The method of claim 1, wherein the first random access preamble is a beam recovery random access channel preamble, and the first random access resource is a beam recovery random access channel resource.

9. A computer implemented method for operating a user equipment (UE), the method comprising:

selecting, by the UE, a first beam in response to detecting a beam failure;

selecting, by the UE, a random access resource from a plurality of random access resources assigned to the UE;

sending, by the UE to an access node via the selected random access resource, the random access preamble to indicate a beam failure recovery request, wherein the random access preamble and the selected random access resource at least partially identify the first beam;

receiving, by the UE from the access node, a first message responsive to the random access preamble; and determining, by the UE, that the first message includes one or more first bits set to request first additional information about the first beam, and based thereon, sending, by the UE to the access node, a second message including the first additional information about the first beam.

10. The method of claim 9, wherein the first additional information about the first beam comprises at least one of channel quality information of the first beam, a beam index of a beam failure reference signal carried by the first beam, or a channel state information reference signal (CSI-RS) resource index (CRI) of the first beam.

11. The method of claim 10, wherein the first additional information about the first beam comprises the channel quality information of the first beam, and wherein the channel quality information of the first beam comprises at least one of a reference signal received power (RSRP) of the first beam, a reference signal received quality (RSRQ) of the first beam, a signal plus interference to noise ratio (SINR) of the first beam, or a signal to noise ratio (SNR) of the first beam.

12. The method of claim 9, wherein the one or more first bits are set to a first value to request the first additional information about the first beam, and wherein a second value of the one or more first bits is configured to indicate that the first additional information about the first beam is not requested.

13. The method of claim 12, wherein the second value is a zero value.

14. The method of claim 9, wherein the random access preamble is one of a plurality of random access preambles assigned to the UE.

15. The method of claim 9, wherein the random access preamble is a beam recovery random access channel preamble, and wherein the random access resource is a beam recovery random access channel resource.

16. An access node comprising:

a memory storage comprising instructions; and one or more processors in communication with the memory storage, wherein the one or more processors execute the instructions to:

receive, from a user equipment (UE) via a first random access resource, a first random access preamble that indicates a beam failure recovery request, wherein the first random access preamble and the first random access resource at least partially identify a first beam selected by the UE, and wherein the first random access resource is one of a plurality of random access resources assigned to the UE, identify a beam failure in accordance with the beam failure recovery request;

determine whether additional information about the first beam is needed; and based on the access node needing the additional information about the first beam:

send, to the UE, a first message responsive to the first random access preamble, the first message including one or more bits set to request the additional information about the first beam, and receive, from the UE, a second message including the additional information about the first beam.

17. The access node of claim 16, wherein the one or more processors further execute the instructions to:

based on the access node not needing the additional information about the first beam:

send, to the UE, a third message responsive to the first random access preamble, the third message including the one or more bits set to not request the additional information about the first beam.

18. The access node of claim 17, wherein the one or more processors further execute the instructions to:
set the one or more bits to a first value in response to the additional information about the first beam being needed, and
set the one or more bits to a second value in response to the additional information about the first beam not being needed.

19. A user equipment (UE) comprising:
a memory storage comprising instructions; and
one or more processors in communication with the memory storage, wherein the one or more processors execute the instructions to:
select a first beam in response to detecting a beam failure,
select a random access resource from a plurality of random access resources assigned to the UE,
send, to an access node via the selected random access resource, the random access preamble to indicate a beam failure recovery request, wherein the random access preamble and the selected random access resource at least partially identify the first beam,
receive, from the access node, a first message responsive to the random access preamble, and
determine that the first message includes one or more first bits set to request first additional information about the first beam, and based thereon,
send, to the access node, a second message including the first additional information about the first beam.

20. The UE of claim 19, wherein the first additional information about the first beam comprises at least one of channel quality information of the first beam, a beam index of a beam failure reference signal carried by the first beam, or a channel state information reference signal (CSI-RS) resource index (CRI) of the first beam.

21. The UE of claim 20, wherein the first additional information about the first beam comprises the channel quality information of the first beam, and wherein the channel quality information of the first beam comprises at least one of a reference signal received power (RSRP) of the first beam, a reference signal received quality (RSRQ) of the first beam, a signal plus interference to noise ratio (SINR) of the first beam, or a signal to noise ratio (SNR) of the first beam.

\* \* \* \* \*